(12) United States Patent
Kim

(10) Patent No.: US 7,822,447 B2
(45) Date of Patent: Oct. 26, 2010

(54) PUSH ROD AND SLIDING TYPE PORTABLE TERMINAL HAVING THE SAME

(75) Inventor: Kwang-Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 563 days.

(21) Appl. No.: 11/873,895

(22) Filed: Oct. 17, 2007

(65) Prior Publication Data

US 2008/0113645 A1    May 15, 2008

(30) Foreign Application Priority Data

Nov. 9, 2006    (KR) .................. 10-2006-0110613

(51) Int. Cl.
*H04M 1/00* (2006.01)
*H04K 3/00* (2006.01)
(52) U.S. Cl. ................ 455/575.4; 379/433.12
(58) Field of Classification Search ... 455/575.3–575.4; 379/433.12–433.13; 361/727
See application file for complete search history.

(56) References Cited

U.S. PATENT DOCUMENTS

2007/0218963 A1\* 9/2007 Kim .................. 455/575.4

FOREIGN PATENT DOCUMENTS

| KR | 102004010835 | 12/2004 |
|---|---|---|
| KR | 1020060024892 | 3/2006 |
| KR | 20-0419717 | 6/2006 |
| KR | 1020060075969 | 7/2006 |
| WO | WO 2006/031078 | 3/2006 |
| WO | WO 2006/098590 | 9/2006 |

\* cited by examiner

*Primary Examiner*—Lee Nguyen
(74) *Attorney, Agent, or Firm*—The Farrell Law Firm, LLP

(57) ABSTRACT

A push rod for a sliding type portable terminal including a first housing and a second housing which is placed on and slidably coupled to the first housing. The push rod provides driving force for slidingly moving the second housing. The push rod includes a casing; support members coupled to the casing to be extended and retracted through both ends of the casing; elastic members for providing elastic force in directions in which the respective support members are extended through both ends of the casing; and rotation members rotatably coupled to outer ends of the support members and rotatably coupled to the respective first and second housings.

16 Claims, 8 Drawing Sheets

PUSH ROD AND SLIDING TYPE PORTABLE TERMINAL HAVING THE SAME

PRIORITY

This application claims priority to an application filed in the Korean Industrial Property Office on Nov. 9, 2006 and assigned Serial No. 2006-0110613, the contents of which are hereby incorporated by reference.

BACKGROUND OF THE INVENTION

1. Field of the Invention

The present invention relates to a portable terminal, and more particularly, to a push rod which provides driving force to a portable terminal having a pair of housings slidably coupled to each other.

2. Description of the Related Art

A portable terminal is an electronic device which performs a mobile communication function for a user. These days, the portable terminal is not simply used only as a mobile communication device, but performs various complicated functions such as a multimedia function for reproducing a music file, a moving picture file, etc., a banking function, mobile banking, and so forth.

Portable terminals are divided into a bar type, a flip type, and a folder type, depending upon the shapes thereof. Recently, a sliding type portable terminal has been disclosed in the art, and has taken most of the portable terminal market together with the folder type portable terminal.

In the bar type portable terminal, a keypad, an input unit such as a microphone, a display unit, and an output unit such as a speaker are provide to a single housing. Because all components for enabling a mobile communication function are provided in one housing, the bar type portable terminal has a simple construction. However, in order to enable voice conversation, a predetermined distance must be secured between the microphone and the speaker. Therefore, limitations necessarily exist in miniaturizing the portable terminal.

In the flip type portable terminal, a flip cover is rotatably mounted to a bar type terminal body, so that a key input unit such as a keypad is covered by the flip cover in a communication standby mode so as to prevent misoperation of the keypad. Nevertheless, similar to the bar type portable terminal, in the flip type portable terminal, it is difficult to secure a predetermined distance between a microphone and a speaker, and limitations necessarily exist in miniaturizing the portable terminal.

In the folder type portable terminal, a pair of housings are foldably coupled to each other. Since an input unit and an output unit are separately located in the housings, merits are provided in miniaturizing the portable terminal. Moreover, in the folder type portable terminal, a desired distance can be easily secured between a microphone and a speaker. Due to these facts, the folder type portable terminal has taken most of the portable terminal market for a long time.

In the sliding type portable terminal, a pair of housings are slidably coupled to each other. An input unit and an output unit are provided separately to the housings. In particular, a key input unit such as a keypad is opened and closed relying upon the relative sliding movement of the housings so that in a communication standby mode, the misoperation of the key input unit is prevented, and in a communication mode, convenience can be provided in manipulating the keypad while providing merits in miniaturizing the portable terminal. Due to these facts, the sliding type portable terminal now has a greater market share than the folder type portable terminal.

In the sliding type portable terminal, the pair of housings are coupled to each other using a sliding module, and automatic and semiautomatic operations are realized using elastic members. As the elastic members, a torsional coil spring or a push rod is used. Specifically, since the push rod can stably execute sliding operation and provides merits in slimming the portable terminal, the push rod is more frequently used as the elastic member of the sliding module.

FIGS. 1 and 2 illustrate a conventional push rod 10 for a sliding type portable terminal. The push rod 10 has support members 13 which are assembled to a casing 11 to be extended out of and retracted into the casing 11. Rotation members 15 are fastened to outer ends of the support members 13. The rotation members 15 are rotatably coupled to respective housings which constitute the sliding type portable terminal, to serve as means for rotatably coupling the push rod 13 to the respective housings of the portable terminal.

Nonetheless, in the conventional push rod, when the rotation members approach nearest each other within the range in which the housings of the portable terminal are slidingly moved, a problem is caused in that, because the direction of driving force is perpendicular to the moving direction of the housings of the portable terminal, the sliding movement of the housings of the portable terminal is interrupted. That is to say, as the direction, in which the force of the push rod is applied, and the direction, in which the housings of the portable terminal are slidingly moved, are perpendicular to each other, the driving force of the push rod is not properly transmitted to the housings of the portable terminal, and the housings are held in a stopped state.

SUMMARY OF THE INVENTION

Accordingly, the present invention has been made to solve the above-mentioned problems occurring in the prior art, and an aspect of the present invention is to provide a push rod which can provide driving force throughout a section through which a pair of housings constituting a portable terminal are slidingly moved, and a portable terminal having the same.

Another aspect of the present invention is to provide a push rod which can ensure reliable sliding movement of a pair of housings constituting a portable terminal, and a portable terminal having the same.

In order to achieve the above aspects, according to one embodiment of the present invention, there is provided a push rod for a sliding type portable terminal including a first housing and a second housing placed on and slidably coupled to the first housing, the push rod providing driving force for slidingly moving the second housing, the push rod including a casing; support members coupled to the casing to be extended and retracted through both ends of the casing; elastic members for providing elastic force in directions in which the respective support members are extended through both ends of the casing; and rotation members rotatably coupled to outer ends of the support members and rotatably coupled to the respective first and second housings.

According to another embodiment of the present invention, there is provided a portable terminal including a first housing; a second housing placed on and coupled to the first housing to be capable of sliding in a lengthwise direction of the first housing; and a push rod including a pair of rotation members which are rotatably coupled to the respective first and second housings and support members which are rotatably coupled to the rotation members, wherein the push rod provides elastic force in directions in which the rotation members are moved away from each other.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein will be omitted for clarity and conciseness.

Figure 1:
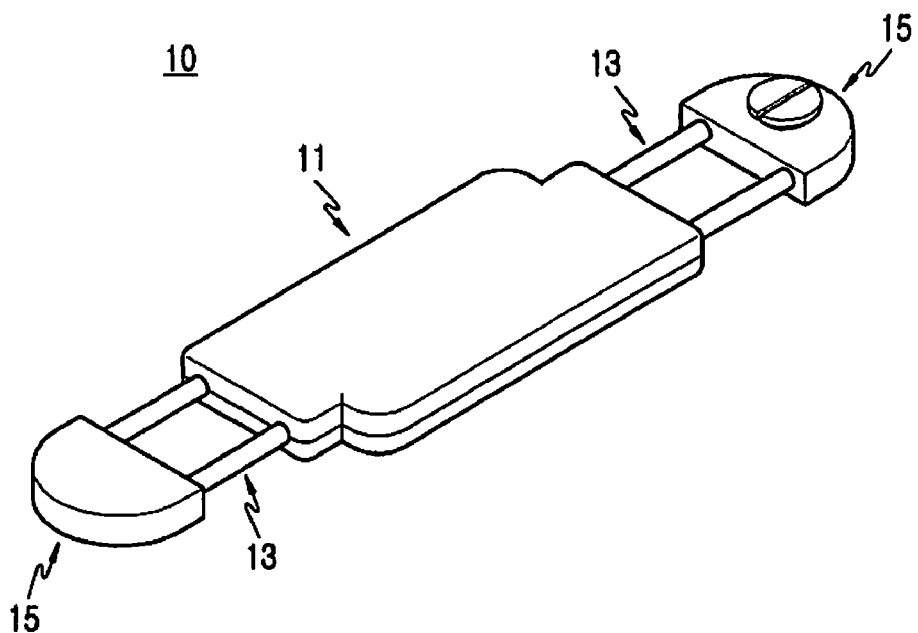
FIG. 1 is a perspective view illustrating a conventional push rod for a sliding type portable terminal.
Figure 2:
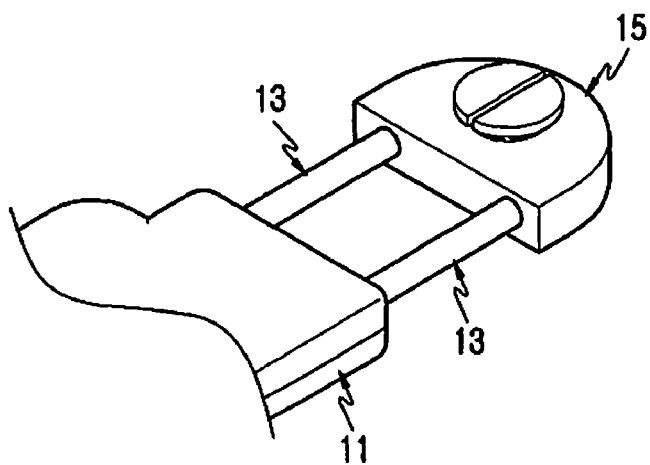
FIG. 2 is an enlarged perspective view illustrating the main part of the push rod shown in FIG. 1.
Figure 3:
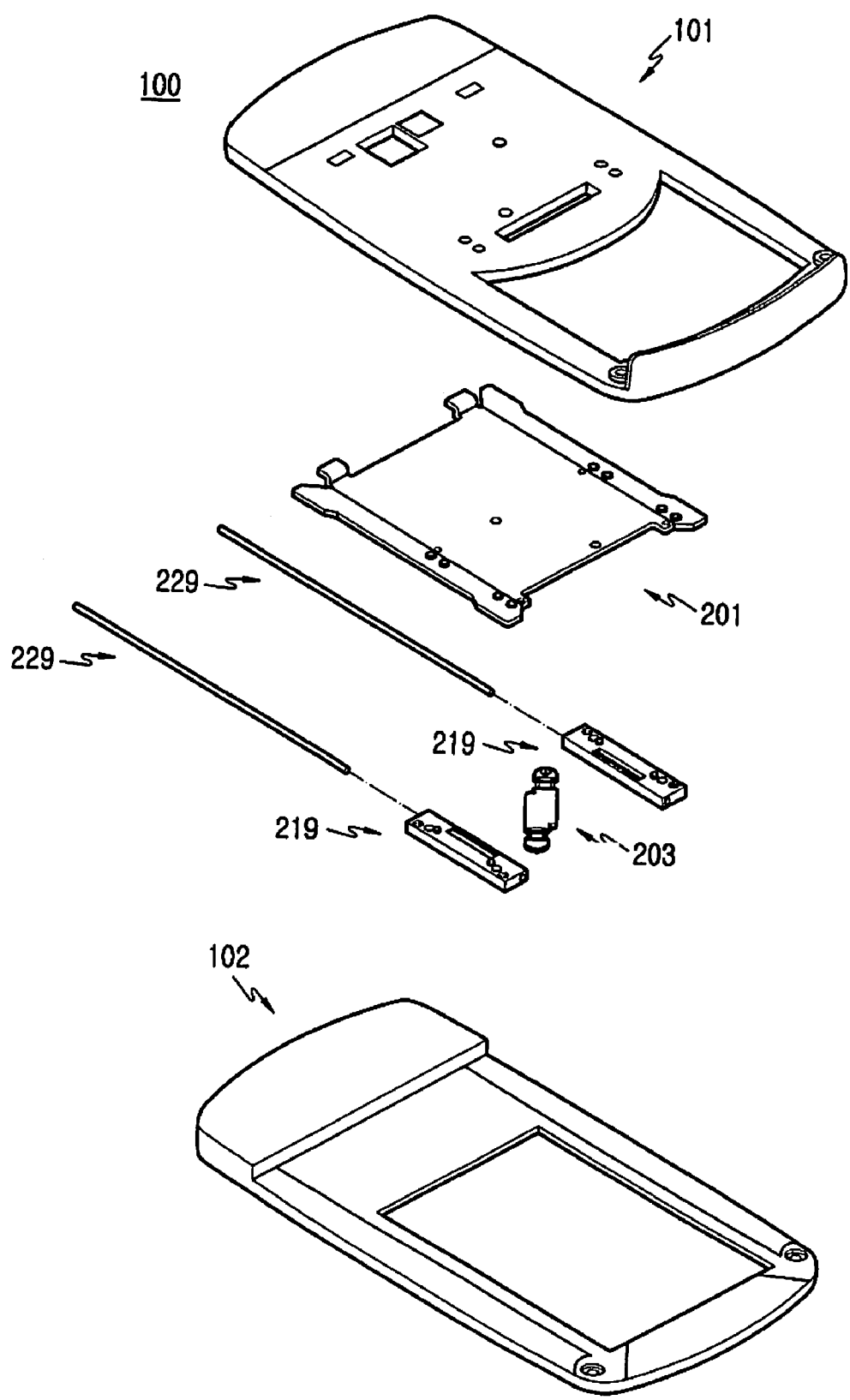
FIG. 3 is an exploded perspective view illustrating a sliding type portable terminal having a push rod in accordance with an embodiment of the present invention.

Referring to FIG. 3, a portable terminal 100 having a push rod 203 in accordance with an embodiment of the present invention has a first housing 101 and a second housing 102. The first and second housings 101 and 102 are slidably coupled to each other by guide rods 229 and a guide member 201.

Figure 8:
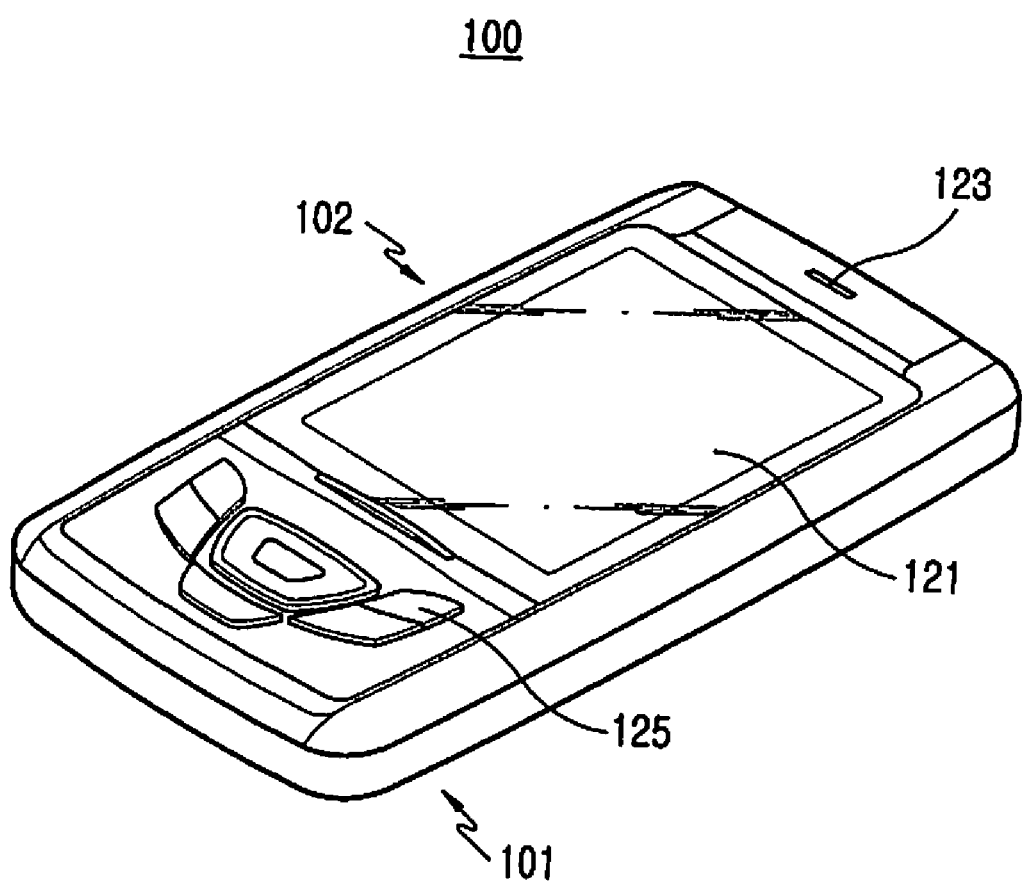
FIG. 8 is an assembled perspective view illustrating the sliding type portable terminal shown in FIG. 3.
Figure 9:
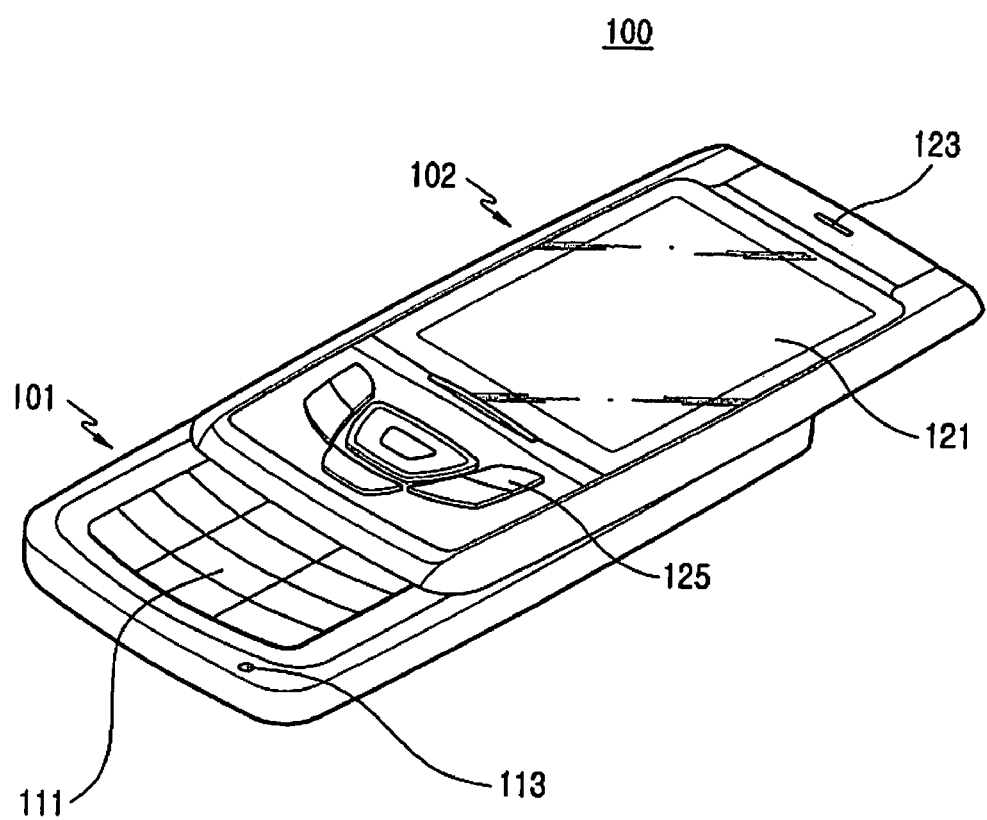
FIG. 9 is a perspective view illustrating a state in which a second housing of the portable terminal shown in FIG. 8 is slidingly moved.

Referring to FIGS. 8 and 9, the first housing 101 has a keypad 111 and a microphone 113 which are provided to the lower portion of the upper surface of the first housing 101. The guide member 201 is mounted to the upper portion of the upper surface of the first housing 101. Further, the second housing 102 is placed on and slidably coupled to the first housing 101. A display unit 121, a speaker 123, and a function keypad 125 are provided to the upper surface of the second housing 102.

The second housing 102 is coupled to the first housing 101 by a sliding module and is slidingly moved in the lengthwise direction of the first housing 101. As the second housing 102 is slidingly moved, the lower portion of the upper surface of the first housing 101, that is, the keypad 111, etc. are opened and closed.

The guide rods 229 are mounted to the lower surface of the second housing 102 and are slidably coupled to the guide member 201. Guide holders 219 are mounted to the guide member 201, and the guide rods 229 are slidingly moved through the guide holders 219. The guide rods 229 and the guide member 201 are preferably made of metallic material to have excellent strength and durability. The guide holders 219 are made of synthetic resin such as POM (polyoxymethylene), having excellent mechanical properties including abrasion resistance, lubricability, and so forth. Since the guide holders 219 are brought into direct contact during sliding with the guide rods 229, the guide holders 219 are preferably made of synthetic resin so as to decrease frictional force and to reduce noise generated due to friction.

Figure 4:
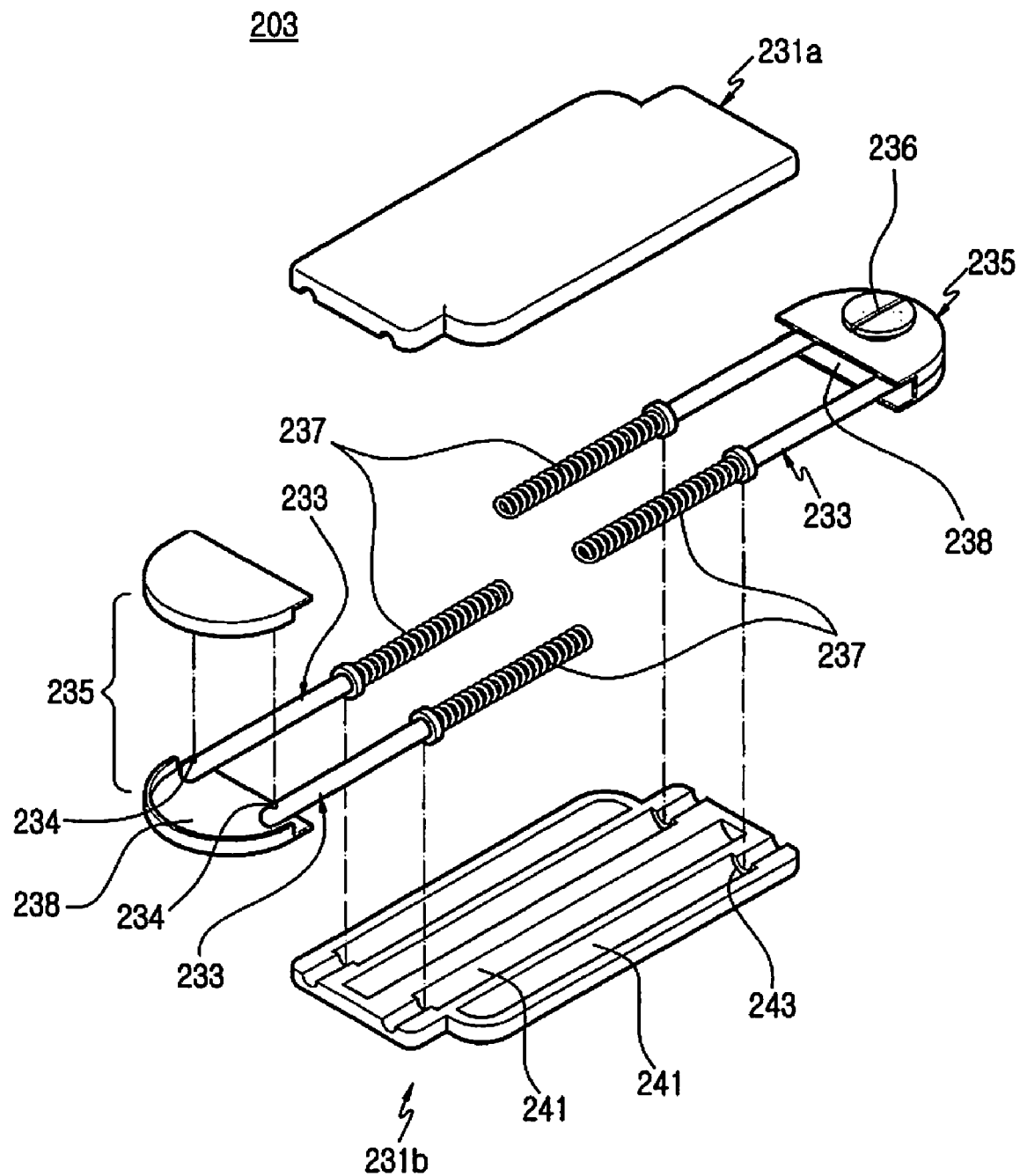
FIG. 4 is an exploded perspective view illustrating the push rod shown in FIG. 3.
Figure 5:
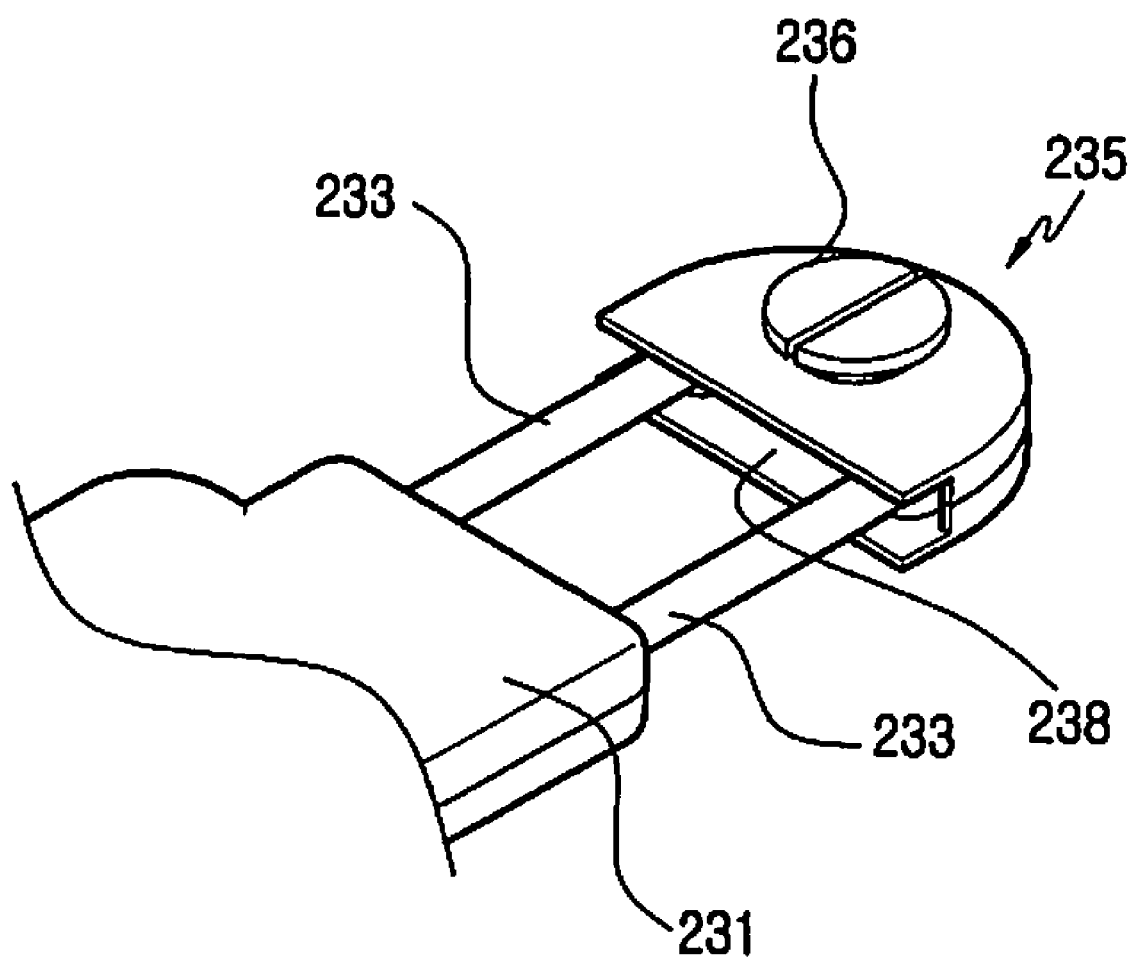
FIG. 5 is an enlarged perspective view illustrating the main part of the push rod shown in FIG. 4.

Referring to FIGS. 4 and 5, the push rod 203 includes a casing 231 composed of upper and lower cases 231a and 231b, support members 233, elastic members 237, and rotation members 235.

First and second driving grooves 241 are defined in the casing 231. The first driving grooves 241 are defined in a pair, and the second driving grooves 241 are also defined in a pair. The first driving grooves 241 extend from one end of the casing 231, and the second driving grooves 241 extend from the other end of the casing 231. The first and second driving grooves 241 are alternately arranged in the casing 231. A stepped portion 243 is formed in each driving groove 241 so that one end of each groove 241, which extends up to the end of the casing 231, has a decreased diameter. Each pair of driving grooves 241 is substantially similar to the other since they have slightly different lengths and almost the same shape. Depending upon which end of the casing 231 the driving grooves extend up to, the driving grooves 241 are divided into the first and second driving grooves 241.

Each of the support members 233 is received in each of the first and second driving grooves 241 to be extended out of and retracted into the casing 231. Elastic force is applied to each of the support members 233 from each of the elastic members 237 in the directions in which the support members 233 extend out of the casing 231.

Each of the elastic members 237 is received in each of the first and second driving grooves 241 and is supported by one of the flanges formed on the circumferential outer surfaces of the support members 233 to apply elastic force to each of the support members 233. The flanges formed on the circumferential outer surface of the support members 233 are seated against the stepped portions 243 in the first and second driving grooves 241 to prevent the support members 233 from being released from the casing 231. A compression coil spring is suitable for the elastic member 237.

Each rotation member 235 includes an upper case and a lower case, the cases are coupled to each other to constitute a single body. Each of the rotation members 235 is positioned adjacent to one of both ends of the casing 231. An opening 238 is defined in one end of the rotation member 235, the end facing the casing 231, and the outer ends of each pair of support members 233 are inserted into the opening 238 of each rotation member 235. Pivot pins 234 are provided to the outer ends of each pair of support members 233 to rotatably couple each pair of support members 233 to each rotation member 235 in the opening 238. By these facts, the support members 233 are rotatably coupled to the rotation members 235. One rotation member 235 is mounted to the second housing 102, and the other rotation member 235 is mounted to the first housing 101 to transmit driving force generated by the push rod 203 to the first and second housings 101 and 102.

Figure 6:
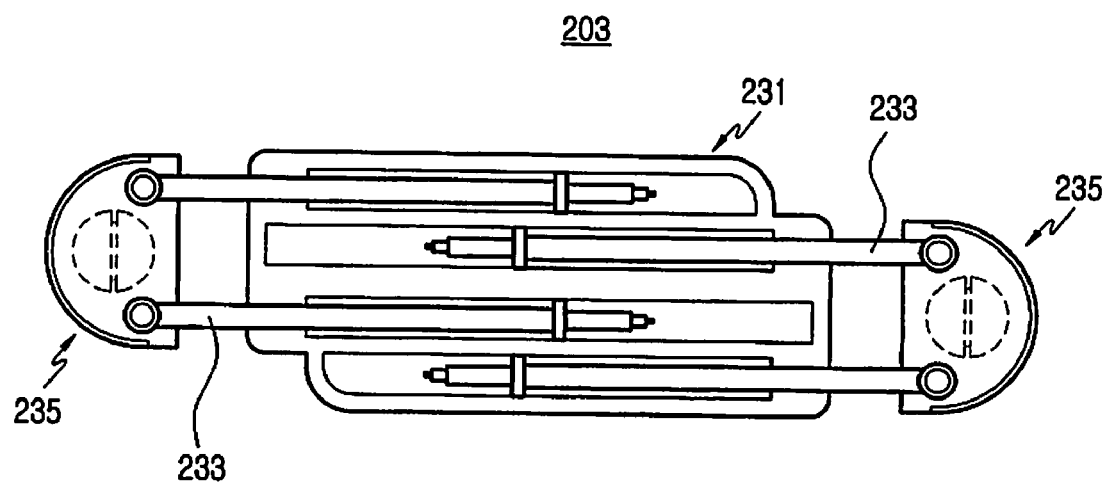
FIGS. 6 and 7 are views explaining operations of the push rod shown in FIG. 4.
Figure 7:
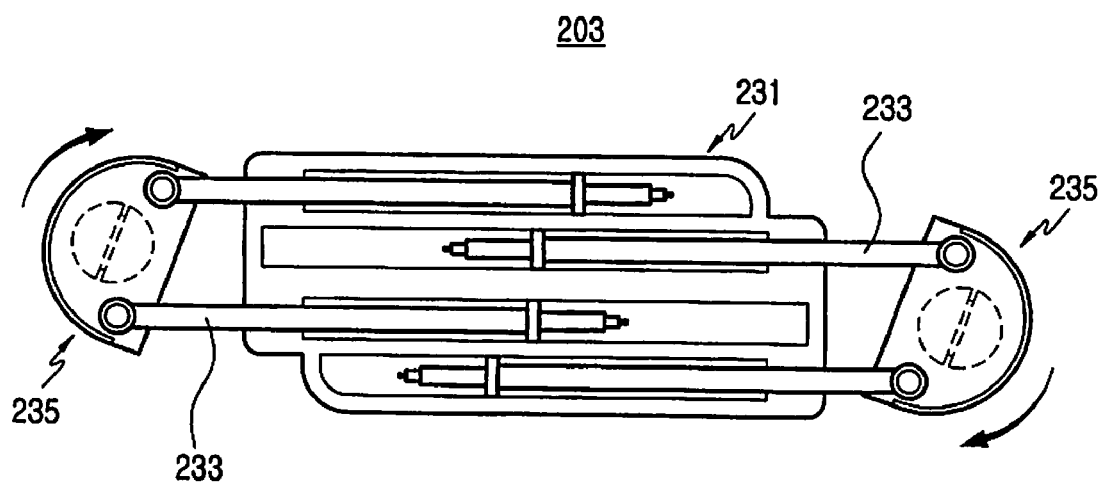

Referring to FIGS. 6 and 7, when the support members 233 are retracted into the casing 231 so that the rotation members 235 approach each other, elastic force is accumulated in the elastic members 237, and the support members 233 tend to extend out of the casing 231.

At this time, the elastic force applied to the pair of support members 233 which are positioned outward is set to be greater than the elastic force applied to the pair of support members 233 which are positioned inward. Accordingly, as the elastic force of the elastic members 237 are applied to the rotation members 235 through the support members 233, the rotation members 235 are rotated with respect to the casing 231.

When the rotation members 235 approach a critical point that they are nearest each other, the driving force of the push rod 203 is applied perpendicularly to a sliding direction of the housings 101 and 102 and the driving force would be maintained in a balanced state. However, since the rotation members 235 are rotating, the driving force of the push rod 203 becomes unbalanced, as a result of which the housings 101 and 102 of the portable terminal 100 can be slidingly moved without being stopped at the critical point.

Hereafter, the opening and closing operations of the portable terminal 100 and the function of the push rod 203 will be described with reference to FIGS. 8 through 10. The second housing 102 is constructed in a manner such that it can be moved only in an upward direction from a closed position where it overlaps the first housing 101. Further, the push rod 203 is installed in a manner such that a critical point at which the rotation members 235 approach nearest each other is positioned within a sliding range of the second housing 102.

Figure 10:
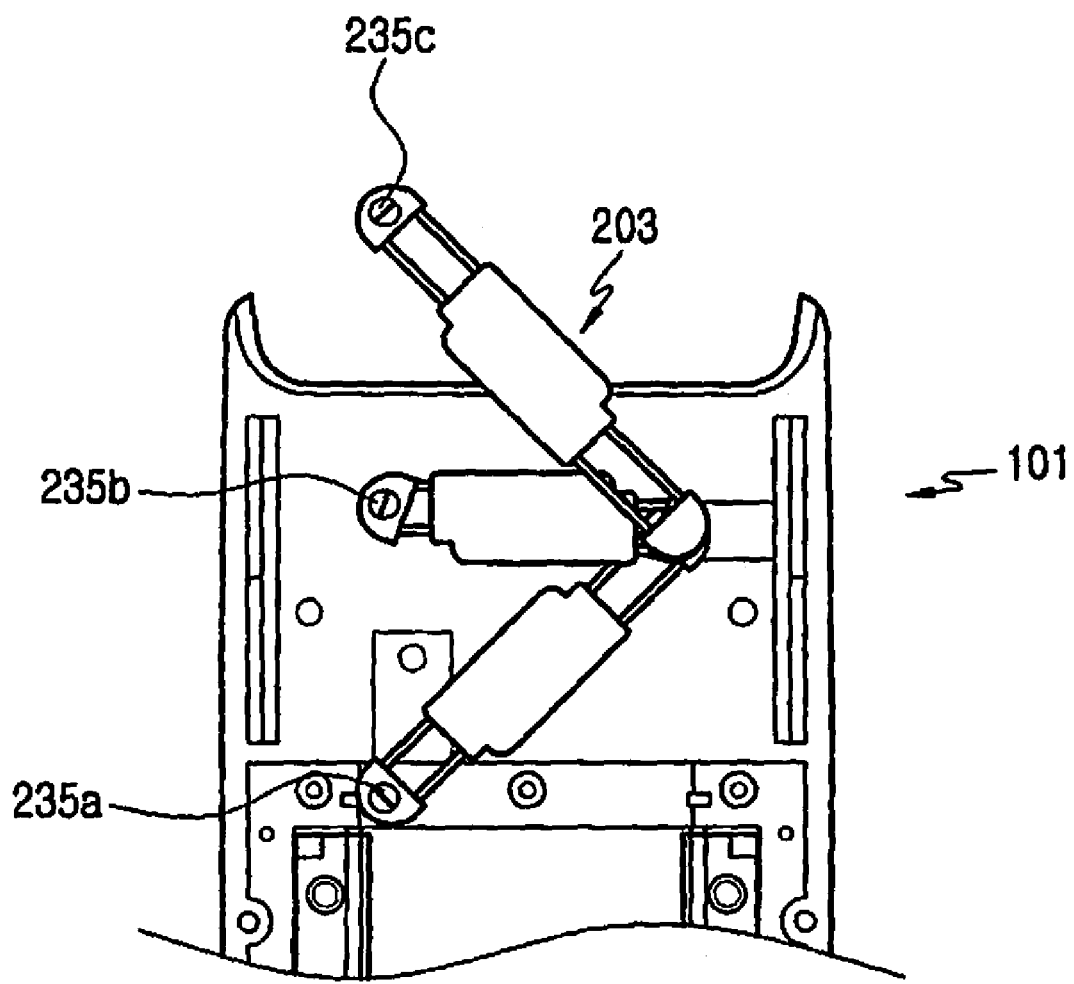
FIG. 10 is a view explaining the operations of the push rod while the second housing of the portable terminal shown in FIG. 8 is slidingly moved.

As shown in FIG. 10, with the first and second housings 101 and 102 overlapping, one rotation member 235 is positioned at a first point 235a. At this time, the support members 233 are extended out of the casing 231, and are still applied with the elastic force of the elastic members 237.

As a user gradually moves the second housing 102 upward and opens the keypad 111, one rotation member 235 is gradually moved to a second point 235b, and gradually approaches the other rotation member 235. As a consequence, the elastic force accumulated in the elastic members 237 is gradually increased. During the movement between points 235a and 235b, the elastic force accumulated in the elastic members 237 is applied as driving force for moving the second housing 102 in a direction in which the second housing 102 overlaps the first housing 101.

The second point 235b represents a critical point at which the rotation members 235 approach nearest each other and the driving force of the push rod 203 and the sliding direction of the second housing 102 are perpendicular to each other. At this time, as the rotation members 235 are rotating as shown in FIG. 7, an unbalanced state of the driving force is caused. Thus, the second housing 102 is continuously slidingly moved past the second point 235b.

From the time that the second housing 102 passes the second point 235b, the elastic force accumulated in the elastic members 237 is applied as driving force for moving the second housing 102 upward of the first housing 101. Hence, even though the user does not apply force to slidingly move the second housing 102 from the time that the second housing 102 passes the second point 235b, the second housing 102 is slidingly moved by the driving force of the push rod 203, by which the keypad 111 is completely opened, and one rotation member 235 is stopped at a third point 235c.

Consequently, the push rod 203 is mounted to the sliding type portable terminal and provides driving force for slidingly moving the housings which constitute the portable terminal. Within a predetermined section from a position where the housings of the portable terminal overlap each other, the driving force of the push rod 203 is applied in a direction in which the housings overlap with each other, and out of the predetermined section, the driving force of the push rod 203 is applied in a direction in which the keypad, etc. provided to one housing are opened.

As is apparent from the above description, the sliding type portable terminal having the push rod according to the present invention provides advantages in that, since the rotation members mounted to the housings of the portable terminal and support members for transmitting elastic force of elastic members are rotatably constructed, reliable sliding movement of the housings of the portable terminal is ensured. That is to say, when the driving force of the push rod is perpendicular to the sliding direction of the housings of the portable terminal, the rotation members are rotated to cause an unbalanced state of driving force. Therefore, although the direction of the driving force and the sliding direction of the housings are perpendicular to each other at the critical point, the housings of the portable terminal are not stopped and can reliably implement relative sliding movement.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A push rod for a sliding type portable terminal including a first housing and a second housing slidably coupled to the first housing, the push rod providing driving force for slidingly moving the second housing, the push rod comprising:
   a casing;
   support members coupled to the casing, the support members being extended and retracted through both ends of the casing;
   elastic members for providing elastic force in directions in which the respective support members are extended through both ends of the casing; and
   a pair of rotation members, each rotation member rotatably coupled to outer ends of the support members and rotatably coupled to one of the first and second housings.

2. The push rod according to claim 1, wherein two pairs of the support members are provided, each support member arranged parallel to one another and coupled to the casing such that each pair of the support members can be extended and retracted through one of both ends of the casing.

3. The push rod according to claim 2, wherein each of the rotation members is positioned adjacent to one of both ends of the casing, and each pair of the support members is rotatably coupled to one of the rotation members.

4. The push rod according to claim 2, wherein support members in each of the two pairs are applied with elastic forces having different magnitudes.

5. The push rod according to claim 1, wherein each rotation member is defined with an opening on one end surface of the rotation member, and outer ends of each pair of support members are rotatably coupled to one rotation member in the opening of the one rotation member.

6. The push rod according to claim 1, wherein each elastic member comprises compression coil spring.

7. The push rod according to claim 1, wherein the casing has a pair of first driving grooves which extend from a first end of the casing in a lengthwise direction of the casing, and a pair of second driving grooves which extend from a second end of the casing in the lengthwise direction of the casing, and the support members are respectively received in the first and second driving grooves to be extended and retracted through the first and second ends.

8. The push rod according to claim 7, wherein the first and second driving grooves extend parallel together and are alternately defined in the casing.

9. The push rod according to claim 1, further comprising:
   support projections projecting from surfaces of the rotation members and rotatably coupled to the respective first and second housings.

10. A portable terminal comprising:

a first housing;

a second housing slidably longitudinally coupled to the first housing; and a push rod including support members and a pair of rotation members, each rotation member rotatably coupled to one of the first and second housings, the support members rotatably coupled to the rotation members, wherein the push rod provides elastic force to move the rotation members away from each other.

11. The push rod according to claim 10, wherein a critical point at which the rotation members approach nearest each other is positioned within a sliding range of the second housing.

12. The push rod according to claim 10, wherein a pair of support members are rotatably coupled to each of the rotation members.

13. The push rod according to claim 10, wherein the push rod comprises elastic members and a casing, the support members coupled to the casing and extended out of and retracted into the casing, the casing receiving the elastic members, the elastic members applying elastic force in directions extending the support members out of the casing.

14. The push rod according to claim 13, wherein a pair of support members are rotatably coupled to each of the rotation members.

15. The push rod according to claim 14, wherein the pair of support members are applied with elastic forces having different magnitudes.

16. The push rod according to claim 13, wherein two pairs of support members are provided, arranged parallel together, and coupled to the casing such that each pair of support members can be extended and retracted through one of both ends of the casing.

* * * * *